United States Patent
Dusik et al.

(10) Patent No.: US 10,225,349 B2
(45) Date of Patent: Mar. 5, 2019

(54) SOFTWARE DEVELOPMENT KIT FOR AIRCRAFT TABLET DEVICE AND AIRBORNE APPLICATION SERVER

(71) Applicant: Honeywell International Inc., Morris Plains, NJ (US)

(72) Inventors: Matej Dusik, Brno (CZ); John Beckwith, Westport, CT (US); John Hajdukiewicz, Minneapolis, MN (US); Filip Magula, Albrechtice (CZ); Frantisek Mikulu, Znojmo (CZ); Jiri Vasek, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 156 days.

(21) Appl. No.: 15/334,822

(22) Filed: Oct. 26, 2016

(65) Prior Publication Data
US 2018/0115609 A1    Apr. 26, 2018

(51) Int. Cl.
  *H04W 80/04*    (2009.01)
  *H04L 29/08*    (2006.01)
  *G06F 8/70*    (2018.01)
  *H04W 88/02*    (2009.01)
  *B64D 45/00*    (2006.01)

(52) U.S. Cl.
  CPC ............ *H04L 67/12* (2013.01); *G06F 8/70* (2013.01); *B64D 2045/0075* (2013.01); *H04L 67/02* (2013.01); *H04W 88/02* (2013.01)

(58) Field of Classification Search
  CPC ...... H04L 67/12; H04W 88/02; H04W 72/04; H04W 84/12; H04W 80/04
  See application file for complete search history.

(56) References Cited

U.S. PATENT DOCUMENTS

| 5,992,290 A | 11/1999 | Quebedeaux et al. |
| 2007/0127460 A1* | 6/2007 | Wilber ................ H04L 49/602 370/389 |

(Continued)

OTHER PUBLICATIONS

European Patent Office, "Extended European Search Report for EP Application No. 17197883.6", Foreign Counterpart to U.S. Appl. No. 15/334,822 dated Mar. 2, 2018, pp. 1-9, Published in: EP.

(Continued)

*Primary Examiner* — Chi Ho A Lee
(74) *Attorney, Agent, or Firm* — Bookoff McAndrews, PLLC

(57) ABSTRACT

A server system for an aircraft is provided. In one embodiment, the server system comprises an aircraft server unit that is operative to receive data from one or more data sources, and a software development kit (SDK) application server in operative communication with the aircraft server unit. The SDK application server comprises one or more processing core modules configured to process the data from the one or more data sources, and one or more application modules including one or more aircraft tablet device logic modules that are configured to respectively execute one or more aircraft tablet device applications. The data processed by the one or more processing core modules is separated from the one or more aircraft tablet device logic modules. The SDK application server is configured to communicate with one or more external portable computing devices.

20 Claims, 14 Drawing Sheets

(56) References Cited

U.S. PATENT DOCUMENTS

| | | | |
|---|---|---|---|
| 2009/0198475 A1* | 8/2009 | Sato | G06Q 10/10 |
| | | | 702/188 |
| 2011/0314079 A1* | 12/2011 | Karande | G06F 9/54 |
| | | | 709/202 |
| 2014/0074322 A1 | 3/2014 | Baumgarten et al. | |
| 2014/0075506 A1* | 3/2014 | Davis | H04L 67/12 |
| | | | 726/3 |
| 2014/0222254 A1 | 8/2014 | Ribich | |
| 2014/0310679 A1* | 10/2014 | Bhattacharya | G06F 11/362 |
| | | | 717/102 |
| 2014/0341107 A1* | 11/2014 | Abadie | H04B 7/18506 |
| | | | 370/316 |
| 2015/0005989 A1* | 1/2015 | Beltrand | B64C 19/00 |
| | | | 701/3 |
| 2015/0019862 A1 | 1/2015 | Uczekaj et al. | |
| 2015/0327307 A1* | 11/2015 | Randrianasolo | H04W 12/04 |
| | | | 370/329 |
| 2016/0015497 A1* | 1/2016 | Hallahan | A61M 5/19 |
| | | | 604/514 |
| 2016/0373184 A1* | 12/2016 | Oder | G06F 9/45533 |
| 2017/0199833 A1* | 7/2017 | Warner | G06F 13/385 |
| 2017/0200378 A1* | 7/2017 | Smothers | G08G 5/0043 |

OTHER PUBLICATIONS

Hiltunen et al, "Electronic Flight Bag (EFB) 2015 Industry Survey", Federal Aviation Administration—Final Report Oct. 2015, United States Department of Transportation, pp. 1-132, Published in: Washington, DC.

Niavaero, "Aircraft Interface Device (AID)", retrived on Aug. 3, 2016 from www.aircraftit.com/Operations/Vendors/navAero/Modules/extra-module-1.aspx, Aug. 31, 2016, pp. 12, Publisher: Aircraft IT.com 2016.

Alcock, "UTC Turns Tablets into EFBs with Tim Cockpit Interface", "retrived on Aug. 3, 2016 from www.ainonline.com/aviation-news/2013-10-21-utc-turns-tablets-efbs-tim-cockput-interface", Oct. 21, 2013, pp. 14, Publisher: The Convention News Company, Inc., Published in: US.

Allen, "Electronic Flight Bag", 712003, pp. 1627, Publisher: AERO, Published in: US.

Ballard Technology, "High-Performance Aircraft Interface Devices", retrived on Aug. 3, 2016 from www.ballardtech.com/AID/?s=menu, Aug. 3, 2016, pp. 12, Publisher: Ballard Technology, Inc.

Groundlink AID, "Wireless Aircraft Interface Device & Internet Connectivity for Tablet EFBS", retrived on Aug. 3, 2016 from www.teledynecontrols.com/productsolution/groundlinkaid/overview.asp, Aug. 31, 2016, pp. 12, Publisher: Teledyne Controls LLC, Published in: US.

UTC Aerospace Systems, "Aircraft Interface Device (AID)", Mar. 2016, pp. 12, Publisher: UTC Aerospace Systems, Published in: US.

UTC Aerospace Systems, "Electronic Flight Bag Aircraft Interface Device", Oct. 2012, pp. 12, Publisher: UTC Aerospace Systems, Published in: US.

* cited by examiner

SOFTWARE DEVELOPMENT KIT FOR AIRCRAFT TABLET DEVICE AND AIRBORNE APPLICATION SERVER

BACKGROUND

Non-certified onboard applications and connected aircraft services require software infrastructure to host internal and third party vendor services and applications in a controlled way. Re-hosting of services and applications from various non-certified functions is cost demanding and requires substantial software development effort. Also, reusability of components within a connected aircraft end to end solution is currently not fully enabled.

SUMMARY

A server system for an aircraft is provided. In one embodiment, the server system comprises an aircraft server unit that is operative to receive data from one or more data sources, and a software development kit (SDK) application server in operative communication with the aircraft server unit. The SDK application server comprises one or more processing core modules configured to process the data from the one or more data sources, and one or more application modules including one or more aircraft tablet device logic modules that are configured to respectively execute one or more aircraft tablet device applications. The data processed by the one or more processing core modules is separated from the one or more aircraft tablet device logic modules. The SDK application server is configured to communicate with one or more external portable computing devices.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
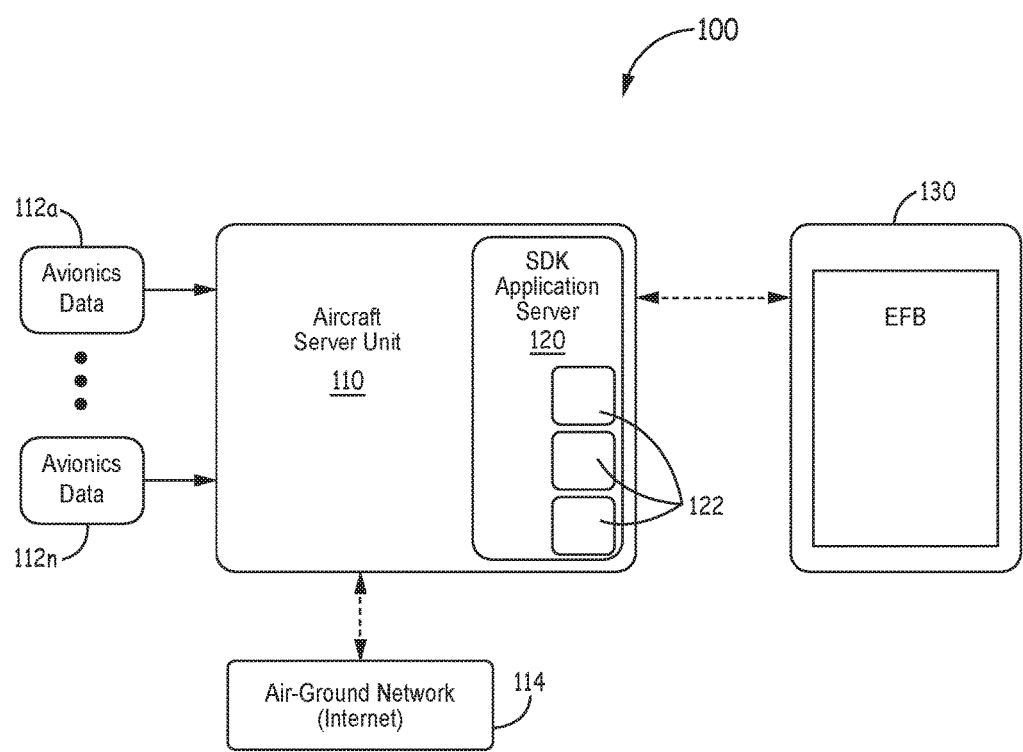
FIG. 1 is a block diagram of an exemplary architecture of a server system for an aircraft, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for implementing a software development kit architecture for aircraft tablet devices, such as electronic flight bags, and airborne application servers are disclosed. The software development kit (SDK) architecture provides for access to avionics data in a controlled way by an electronic flight bag (EFB). The SDK architecture ensures reusability of functional code, better testing of isolated functions, and portability of EFB function code to various aircraft and EFB hardware device platforms.

The present systems provide for the separation of EFB application logic and input/output (IO) data processing into backend software components, which can be run on an airborne avionic server closer to avionics data and ground data. The present systems also provide for separation of a human machine interface (HMI) in an EFB application frontend into separated processes running on an EFB device, and using HTML5 web technology or any other native technology.

The present approach can be used on any EFB platform with any underlying operating system as an infrastructure for EFB functions, or on any avionics application server device, as a software infrastructure enabling device with software functions extensibility by SDK software middleware.

In general, the SDK architecture is a modular software framework that includes software components connected via interfaces. The SDK provides a set of rules and recommendations on how to write interconnectable and highly reusable software modules, such as for EFBs. An interface in the SDK is an abstract class declared in a header file. The name of the interface class corresponds with the name of the interface referenced in meta-data files. A component in the SDK is a piece of software implementing some functionality, and is deployed as a shared library or statically linked to executable binary. The component is accompanied by meta-data describing incorporation to the SDK, including its interface binding. A component may provide multiple interfaces and can refer to multiple other interfaces. For a referencing component, an interface implementation is just a black box. The only direct interaction between component instances is through their interfaces, thus components implementing the same interface are completely interchangeable.

One running instance of the SDK is just one process (multi-threaded) launched by the startup executable binary. The binary has one mandatory parameter referencing to an initialization file listing the components to be started together with some additional information. The binary loads the component libraries and based on their meta-data and configuration creates component instances and links up them via the interfaces.

The components provide services and can also consume services from other components, and thus form a client server architecture. The main application logic can be realized by the services running on the server. An application can be then composed from these software reusable components, e.g., weather, flight plan, flight model, or the like.

The SDK architecture provides for interoperability of various EFB applications, including data, services, and components sharing. The SDK architecture also makes EFB applications independent of the underlying aircraft platform specific avionics systems, and provides unification of the HMI experience on different EFB platforms. In addition, the SDK architecture provides for lower costs of EFB application portability between different EFB platforms, while providing for unified and abstract forms of communication with avionics systems.

Further details of the present system and method are described hereafter with reference to the drawings.

FIG. 1 illustrates an exemplary architecture of a server system 100 for an aircraft, according to one embodiment. The server system 100 includes an aircraft server unit 110 that is operative to receive data from one or more avionics data sources 112a-112n. The aircraft server unit 110 can also be in operative communication with an air-ground network 114, such as the Internet. The aircraft server unit 110 can be an aircraft interface device (AID), ISU, or the like.

A software development kit (SDK) application server 120 is hosted on aircraft server unit 110. A plurality of hosted and third party applications 122, such as EFB applications or other aircraft tablet device applications, resides on SDK application server 120. In addition, one or more data processing modules reside on SDK application server 120 and are configured to process data from avionics data sources 112a-112n or air-ground network 114. The SDK application server 120 can also include EFB logic modules or other aircraft tablet device logic modules that are configured to execute EFB or other aircraft tablet device applications.

The SDK application server 120 is configured to wirelessly communicate with at least one external portable computing device 130, such as a tablet, which can be an EFB running a web-based human machine interface (HMI). The SDK application server 120 enables interoperability between multiple EFB applications, which are accessible by portable computing device 130. During operation of SDK server 120, data processing and HMI logic are separated from each other.

Figure 2:
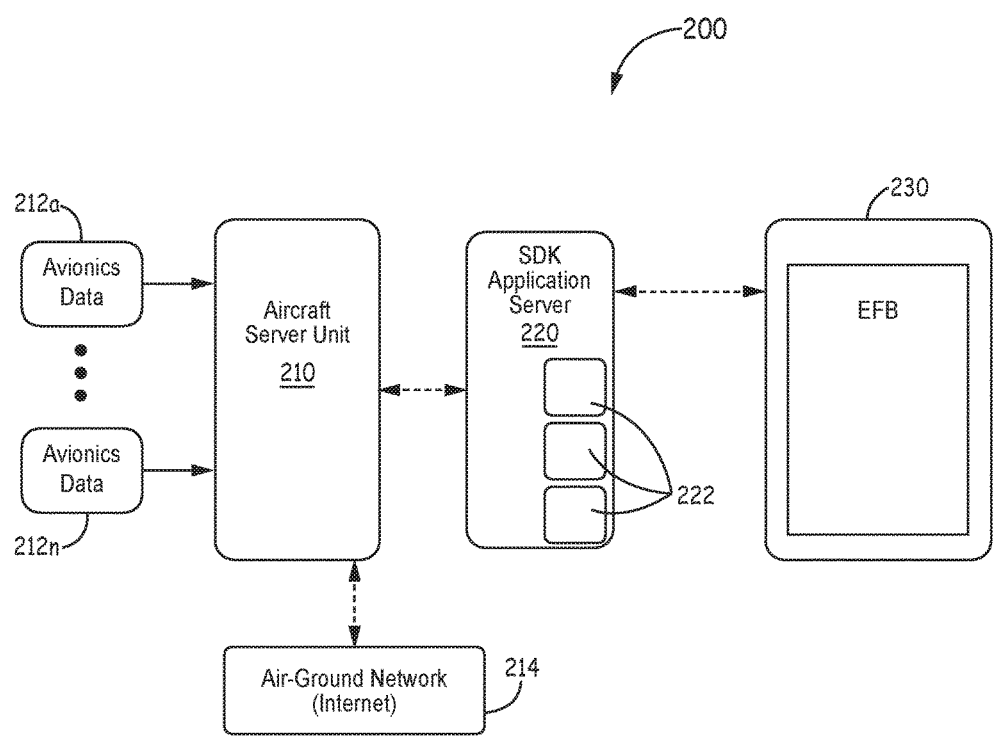
FIG. 2 is a block diagram of an exemplary architecture of a server system for an aircraft, according to another embodiment.

FIG. 2 shows an exemplary architecture of a server system 200 for an aircraft, according to another embodiment. The server system 200 includes an aircraft server unit 210 that is operative to receive data from one or more avionics data sources 212a-212n. The aircraft server unit 110 can also be in operative communication with an air-ground network 214, such as the Internet.

An SDK application server 220 is in operative communication with aircraft server unit 210, but is hosted on a separate device from aircraft server unit 210. A plurality of hosted and third party applications 222, such as EFB applications, resides on SDK application server 220. In addition, one or more data processing modules reside on SDK application server 220 and are configured to process data from avionics data sources 212a-212n or air-ground network 214. The SDK application server 220 can also include EFB logic modules that are configured to execute EFB applications.

The SDK application server 220 is configured to wirelessly communicate with at least one external portable computing device 230, such as a tablet, which can be an EFB running a web-based HMI. The SDK application server 220 enables interoperability between multiple EFB applications, which are accessible by portable computing device 230. During operation of SDK server 220, data processing and HMI logic are separated from each other.

Figure 3:
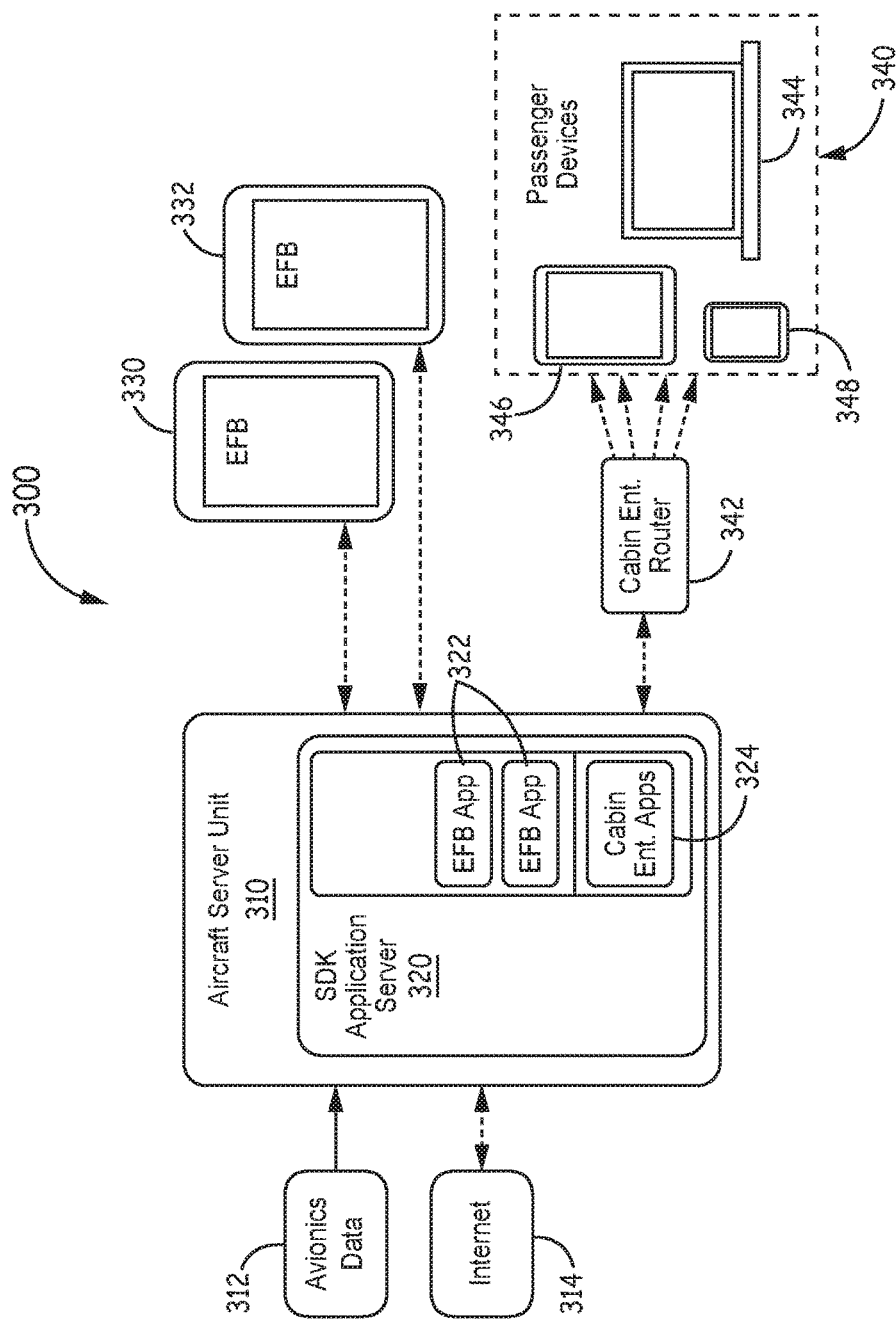
FIG. 3 is a block diagram of an exemplary architecture of a server system for an aircraft, according to a further embodiment.

FIG. 3 illustrates an exemplary architecture of a server system 300 for an aircraft, according to a further embodiment. The server system 300 is similar to server system 100 (FIG. 1), but is additionally configured with cabin entertainment functions for use by aircraft passengers. The server system 300 includes an aircraft server unit 310 that is operative to receive data from one or more data sources, such as an avionics data source 312 and an air-ground network 314 such as the Internet.

An SDK application server 320 is hosted on aircraft server unit 310, and includes a plurality of EFB applications 322, as well as one or more cabin entertainment applications 324. In addition, one or more data processing modules reside on SDK application server 320 and are configured to process data from avionics data source 312 or air-ground network 314. The SDK application server 320 can also include EFB logic modules that are configured to execute EFB applications 322.

The SDK application server 320 is configured to wirelessly communicate with one or more external portable computing devices 330, 332, each of which can be configured as an EFB. The SDK application server 320 enables interoperability between EFB applications 322, which are accessible by portable computing devices 330, 332. In addition, a plurality of passenger devices 340 can operatively communicate with the cabin entertainment applications 324, such as through a cabin entertainment router 342. Exemplary passenger devices 340 include a laptop 344, a tablet 346, a smart phone 348, or the like. The SDK application server 320 is also configured to provide information about a flight and basic information from avionics data source 312 to aircraft passengers, who are using passenger devices 340.

Figure 4:
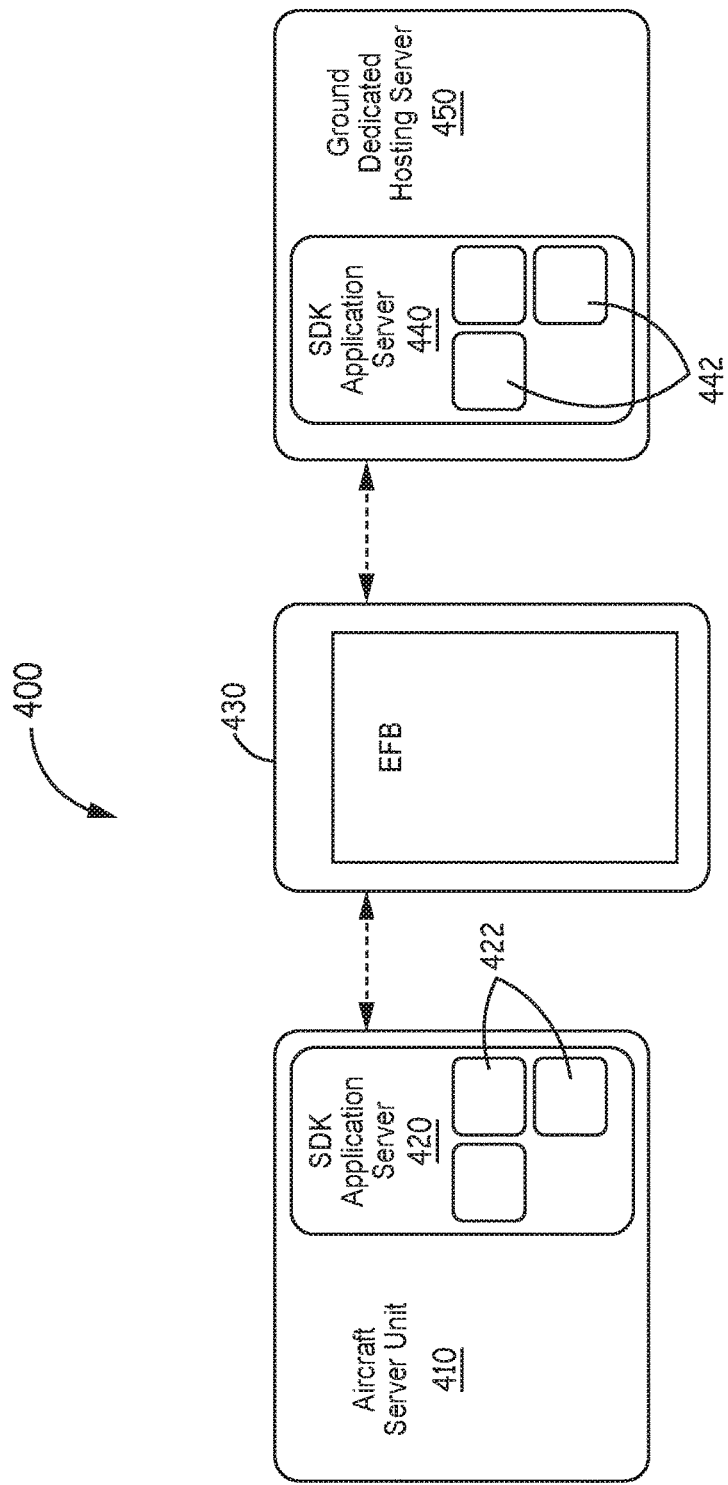
FIG. 4 is a block diagram of an exemplary architecture of a server system for an aircraft, according to an alternative embodiment.

FIG. 4 depicts an exemplary architecture of a server system 400 for an aircraft, according to an alternative embodiment. The server system 400 is similar to server system 100 (FIG. 1), but is additionally configured with off cockpit features for use by a pilot when no onboard connectivity is available.

The server system 400 includes an onboard aircraft server unit 410 that is operative to receive data from one or more data sources. A first SDK application server 420 is hosted on aircraft server unit 410, and includes a plurality of EFB applications 422. In addition, one or more data processing modules reside on SDK application server 420 and are configured to process data from the data sources. The SDK application server 420 can also include EFB logic modules that are configured to execute EFB applications 422. When a pilot is in the cockpit of the aircraft, the SDK application server 420 can wirelessly communicate with a portable computing device 430 operated by the pilot, such as an EFB running a web-based HMI.

The server system 400 also includes a second SDK application server 440, which can be reside on a ground dedicated hosting server 450 located in a ground data center or aircraft operations center, for example. The second SDK application server 440 includes similar components described previously for first SDK application server 420, such as a plurality of EFB applications 442. The SDK application server 440 is accessible by portable device 430 via the Internet or a virtual private network (VPN), such as with a WiFi or cellular connection, and provides off cockpit features for the EFB. All actions which are done when the EFB is running outside of the cockpit using second SDK application server 440 can be synchronized with the first SDK application server 420 in the aircraft, such as through a gate link.

Figure 5:
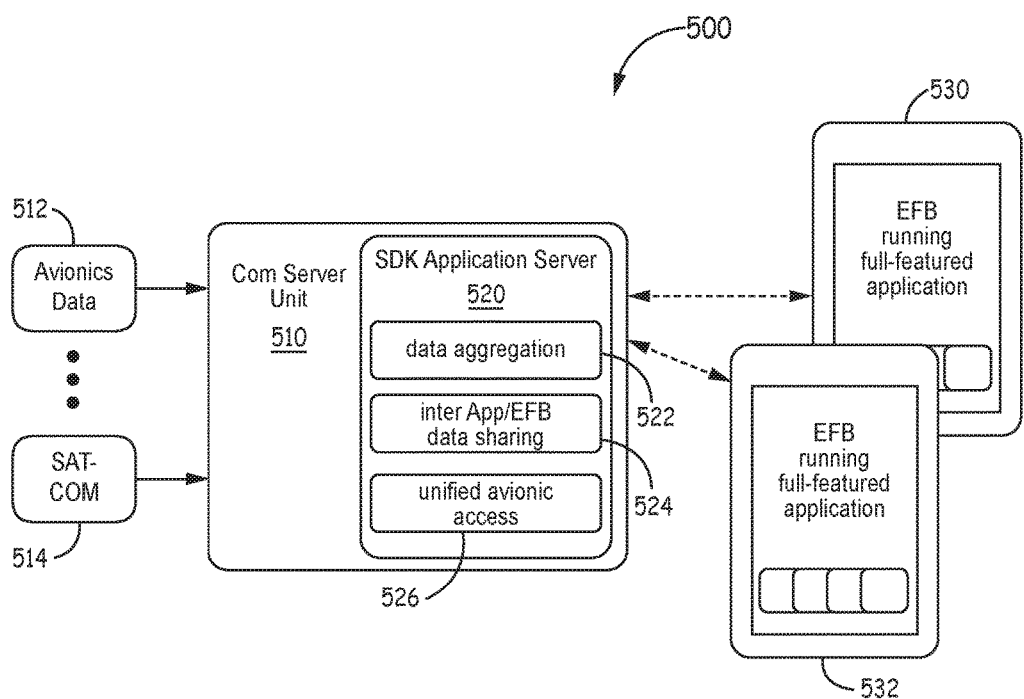
FIG. 5 is a block diagram of an exemplary architecture of a server system for an aircraft, according to another embodiment.

FIG. 5 illustrates an exemplary architecture of a server system 500 for an aircraft, according to another embodiment. The server system 500 is configured for use with a lower performance hosting device, such as a communications server unit 510, which could impact the usability of hosted applications. The communications server unit 510 is operative to receive data from one or more data sources, such as an avionics data source 512 and a satellite communications (SATCOM) source 514.

An SDK application server 520 is hosted on communications server unit 510, and includes a plurality of applications for data aggregation 522, inter app/EFB data sharing 524, and unified avionic access 526. The SDK application server 520 is configured to wirelessly communicate with one or more portable computing devices 530, 532, each of which can be configured as an EFB device running full-featured applications. While EFB applications are hosted on each of portable computing devices 530, 532, all current avionics and ground data are stored in SDK application server 520 and is ready for use by any EFB device at any time. Performance-consuming operations are completed by the portable computing devices 530, 532 and the results are sent back to the SDK application server 520 to be shared with other EFB devices.

Figure 6:
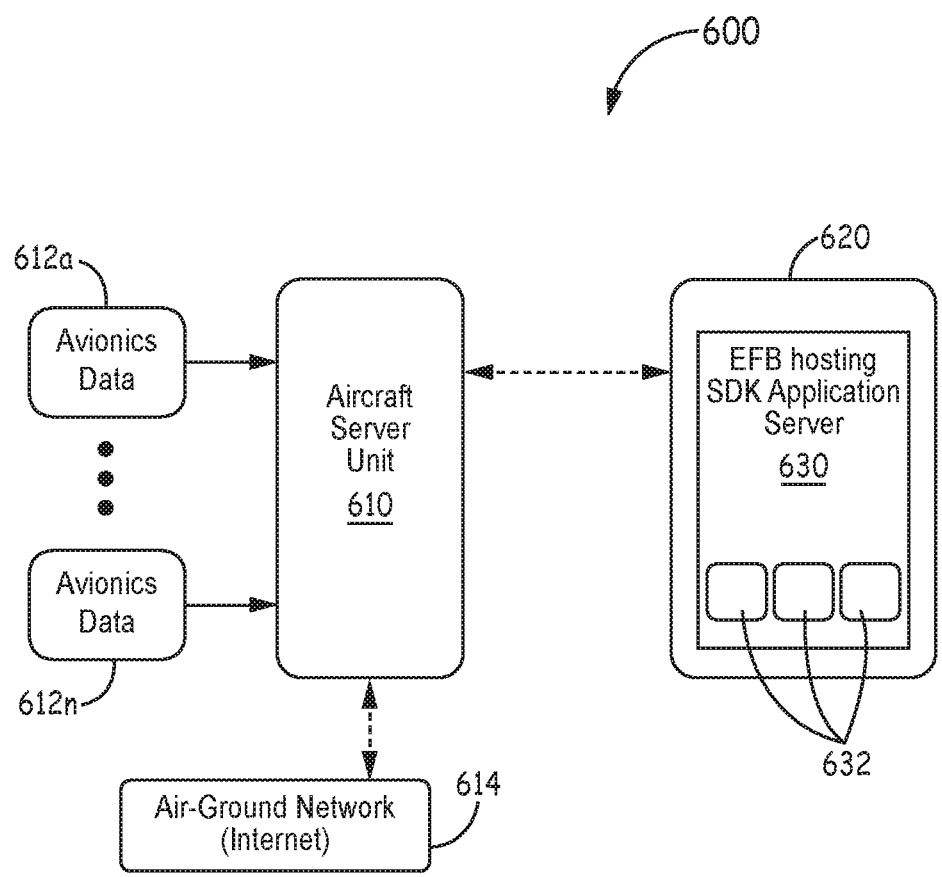
FIG. 6 is a block diagram of an exemplary architecture of a server system for an aircraft, according to another alternative embodiment.

FIG. 6 shows an exemplary architecture of a server system 600 for an aircraft, according to another alternative embodiment. The server system 600 can be employed when no onboard hosting device is used for the EFB applications. The server system 600 includes an aircraft server unit 610 that is operative to receive data from one or more avionics data sources 612a-612n. The aircraft server unit 610 can also be in operative communication with an air-ground network 614, such as the Internet.

A portable computing device 620, such as a tablet, hosts an SDK application server 630, which is in operative communication with aircraft server unit 610. A plurality of hosted and third party applications 632, such as EFB applications, resides on SDK application server 630. In addition, one or more data processing modules reside on SDK application server 630 and are configured to process data from avionics data sources 612a-612n or air-ground network 614. In addition, the SDK application server 630 can run on a native HMI in portable computing device 620.

Figure 7:
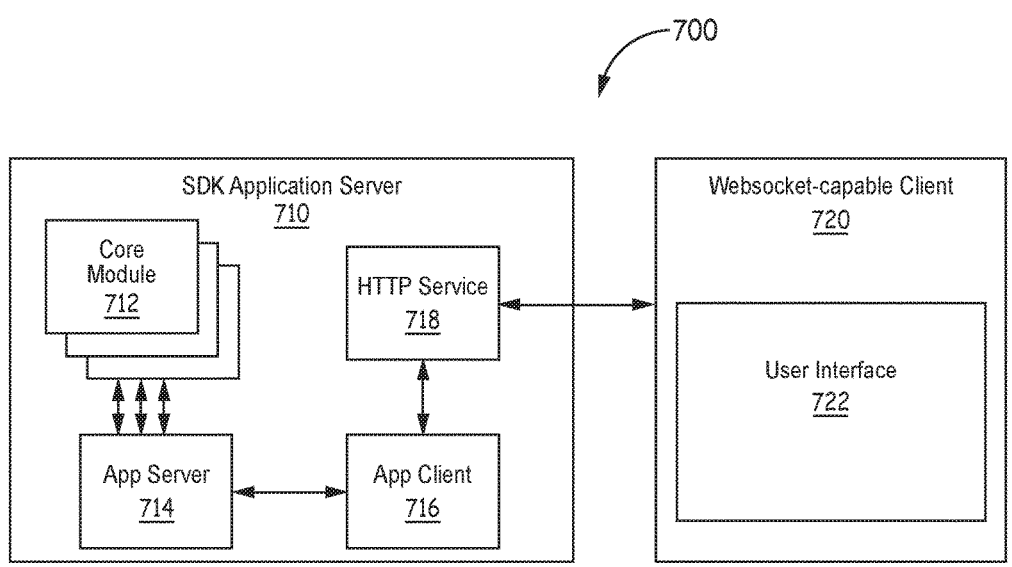
FIG. 7 is a block diagram of an exemplary server-client architecture, which can be implemented by a server system for an aircraft.

FIG. 7 illustrates an exemplary server-client architecture 700, which can be utilized by the SDK application servers disclosed herein. The server-client architecture 700 can be built utilizing hypertext transfer protocol (HTTP) and websocket protocol, for example. The HTTP can be used with structured media communications to distribute web apps, and the websocket protocol provides a full-duplex transmission control protocol (TCP) connection.

The server-client architecture 700 includes an SDK application server 710 that is in operative communication with a websocket-capable client 720. The SDK application server 710 includes one or more processing core modules 712, which are in operative communication with an app server module 714, which in turn operatively communicates with an app client module 716. The SDK application server 710 also includes an HTTP service module 718 that operatively communicates with app client module 716. The SDK application server 710 operatively communicates with a websocket-capable client 720, such as through HTTP service module 718.

The app server module 714 is configured to provide a user interface in a protocol-agnostic way. The app client module 716 binds to the app server module interface and translates it into a protocol-specific communication (e.g., websocket, etc.). The HTTP service module 718 provides two functions, including acting as a conventional HTTP server, serving requests; and acting as a websocket server. The HTTP service module 718 can use libwebsockets, and optionally OpenSSL.

The websocket-capable client 720 includes a user interface 722, which can be provided by a web browser or a native graphical user interface (GUI). The websocket-capable client 720 can also be implemented with C++ (libwebsockets), C# (WebSocket4Net.), Python (websocket-client), Java (Java-Websocket), or the like.

The server-client architecture 700 can be expanded to include any number of core modules, app modules, client modules, used communication protocols, and instances of the modules, including communication services (HTPP service, etc.).

Figure 8A:
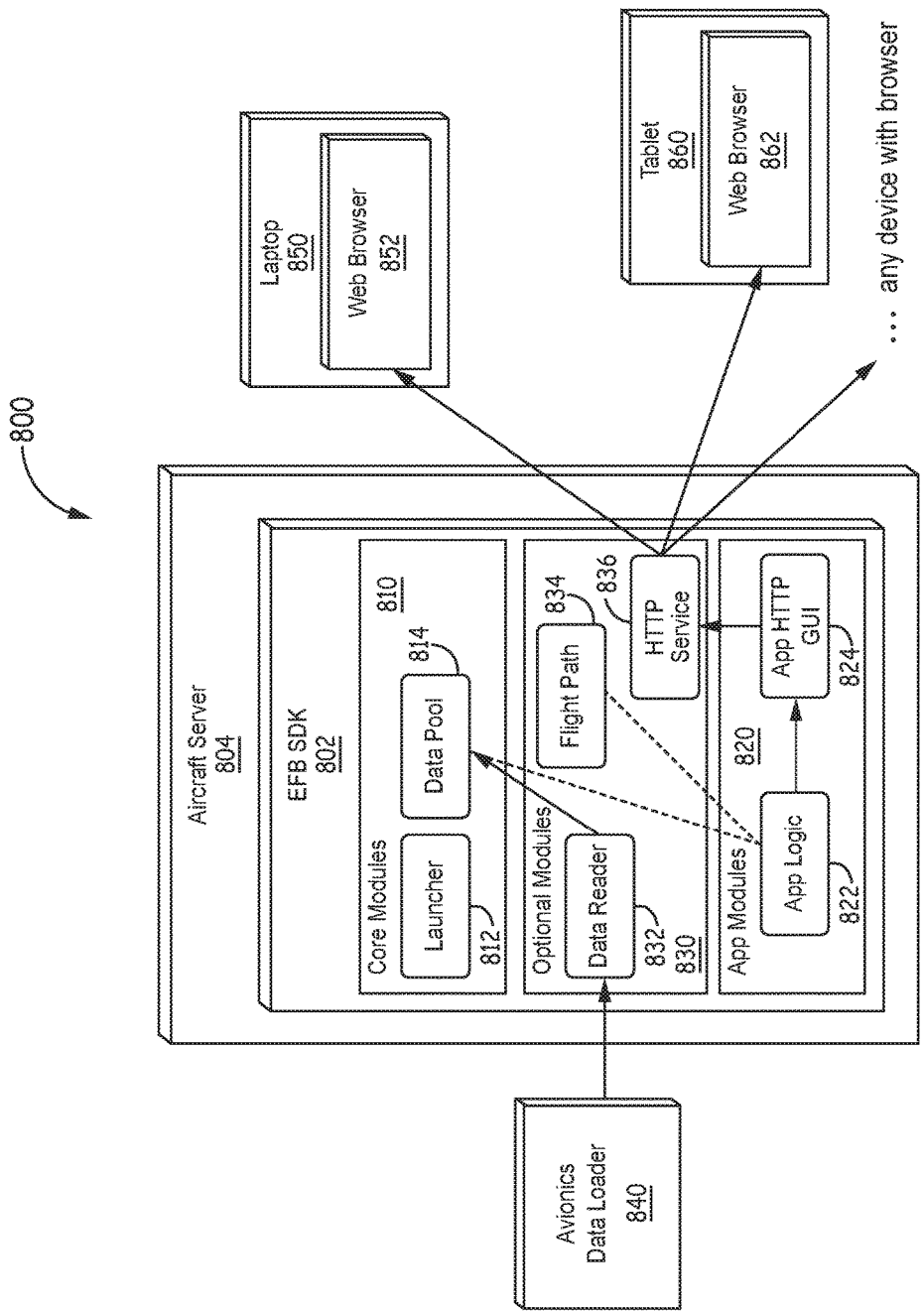
FIGS. 8A and 8B are block diagrams of exemplary implementations of a server system for an aircraft.
Figure 8B:
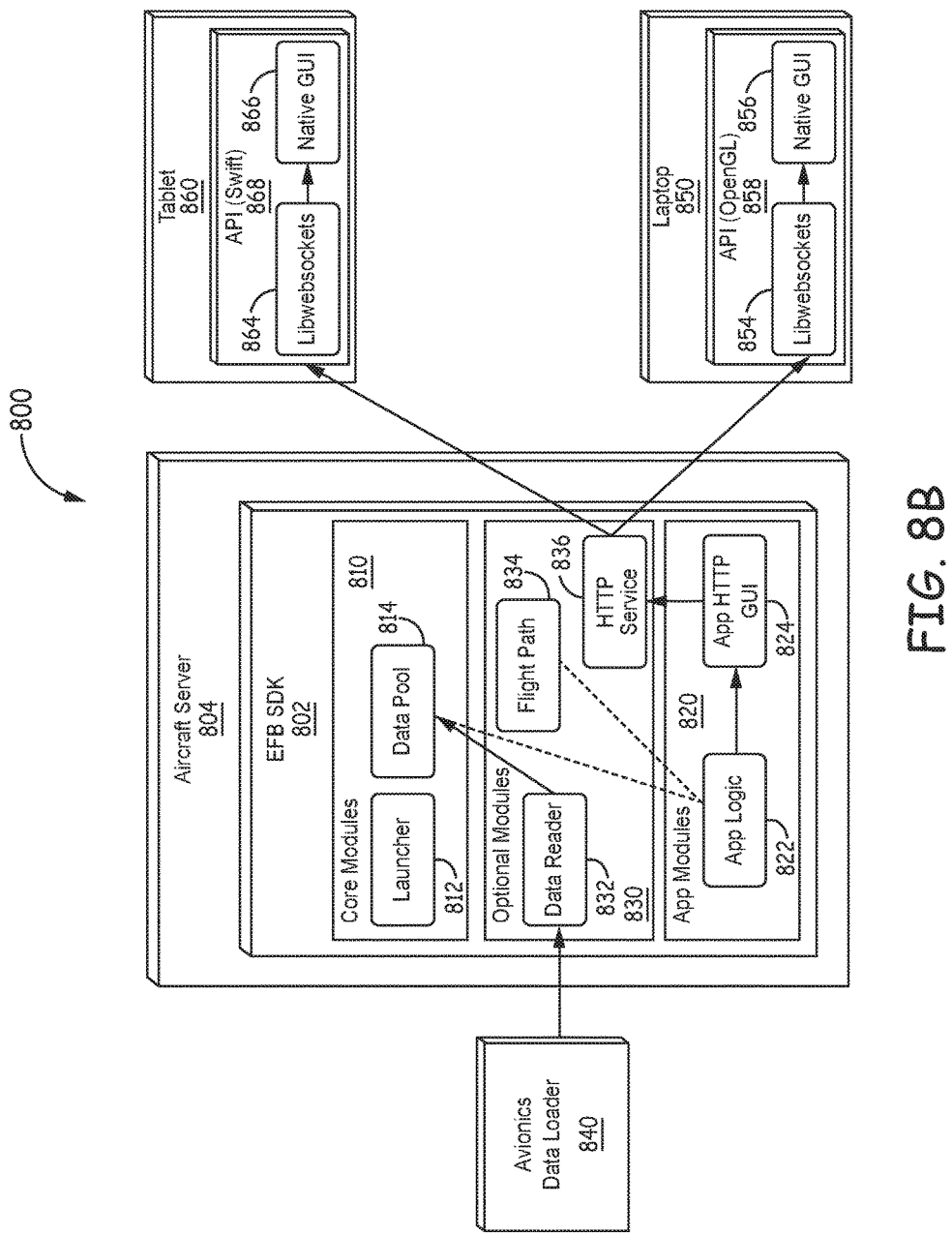

FIGS. 8A and 8B illustrate exemplary implementations of a server system 800 for an aircraft, in which the SDK application server is implemented as an EFB SDK 802 hosted on an aircraft server unit 804. The EFB SDK 802 includes one or more processing core modules 810, one or more application (app) modules 820, and one or more optional modules 830.

The core modules 810 can include a launcher module 812, a data pool module 814, or the like. The app modules 820 can include an app logic module 822, and an app HTTP GUI module 824 (e.g., HTML5 GUI), which is in operative communication with app logic module 822. The optional modules 830 include a data reader module 832, a flight path module 834, and an HTTP service module 836, which is in operative communication with app HTTP GUI module 824.

An avionics data loader 840 is in operative communication with EFB SDK 802. The avionics data loader 840 is configured to send avionics data to EFB SDK 802 through data reader module 832, which in turn sends the avionics data to data pool module 814. The app logic module 822 can access requested data from data pool module 814 and flight path module 834 to instruct HTTP GUI module 824 to create a GUI, which is sent to HTTP service module 836.

In the implementation shown in FIG. 8A, EFB SDK 802 is connectable to any device with a browser. For example, HTTP service module 836 can wirelessly communicate with a laptop 850 through a web browser 852 running on laptop 850, such as by using websockets. The web browser 852 displays requested data or other information on a screen of laptop 850. Likewise, HTTP service module 836 can wirelessly communicate with a tablet 860 (e.g., iPad) through a web browser 862 running on tablet 860, such as by using websockets. The web browser 862 displays requested data or other information on a screen of tablet 860.

In the implementation depicted in FIG. 8B, EFB SDK protocol 802 is connectable to one or more portable devices using a native GUI on the portable devices. For example, HTTP service module 836 can wirelessly communicate with laptop 850 through a libwebsockets module 854 running on laptop 850, such as by using websockets. The libwebsockets module 854 communicates with a native GUI 856 (e.g., Windows GUI), which both operate within an application programming interface (API) 858 (e.g., OpenGL) on laptop 850. The native GUI 856 displays requested data or other information on the screen of laptop 850. Similarly, HTTP service module 836 can wirelessly communicate with tablet 860 through a libwebsockets module 864 running on tablet 860, such as by using websockets. The libwebsockets module 864 communicates with a native GUI 866 (e.g., iOS GUI), which both operate within an API 868 (e.g., Swift) on tablet 860. The native GUI 866 displays requested data or other information on the screen of tablet 860.

Figure 9A:
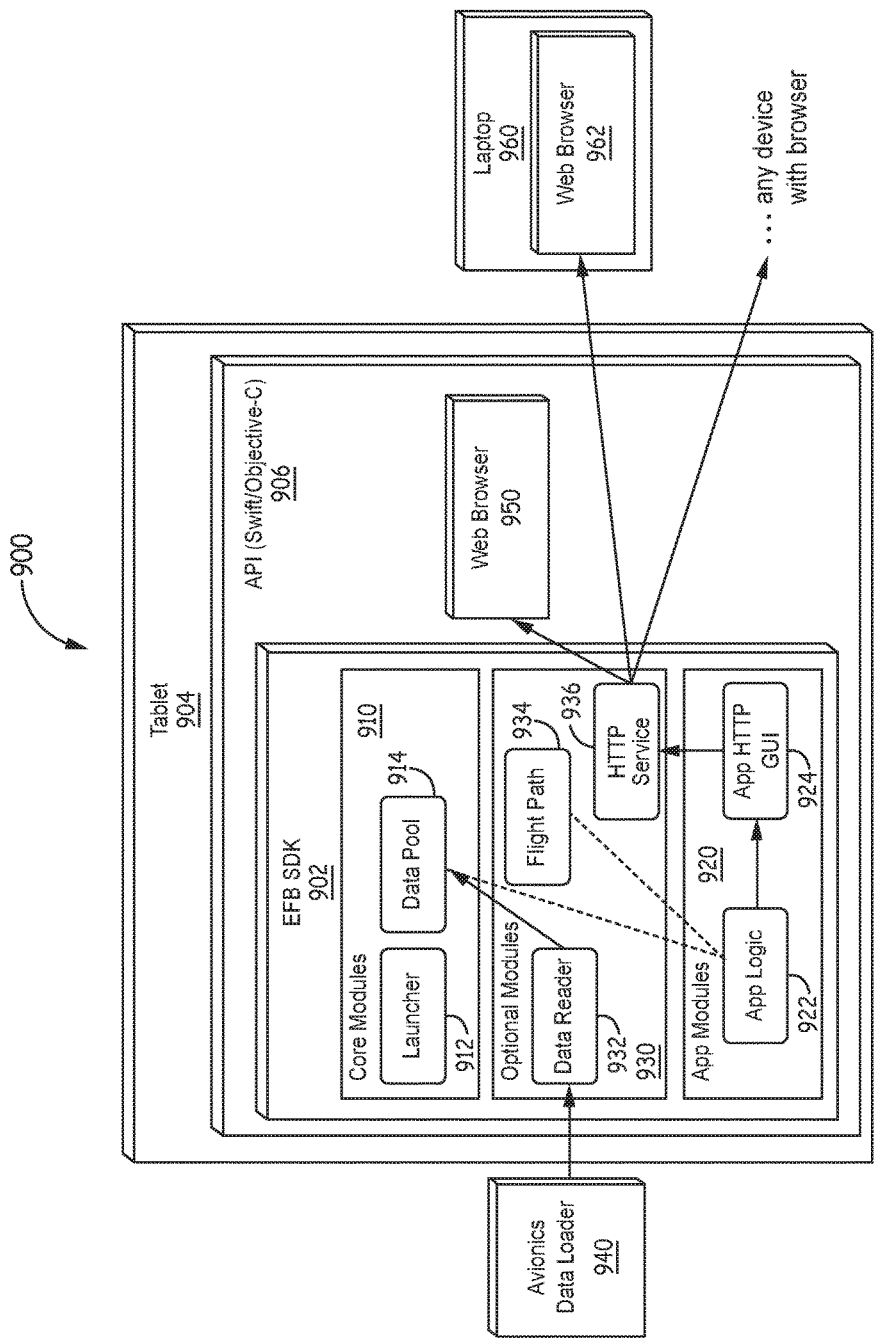
FIGS. 9A and 9B are block diagrams of exemplary implementations of a portable server system for an aircraft.
Figure 9B:
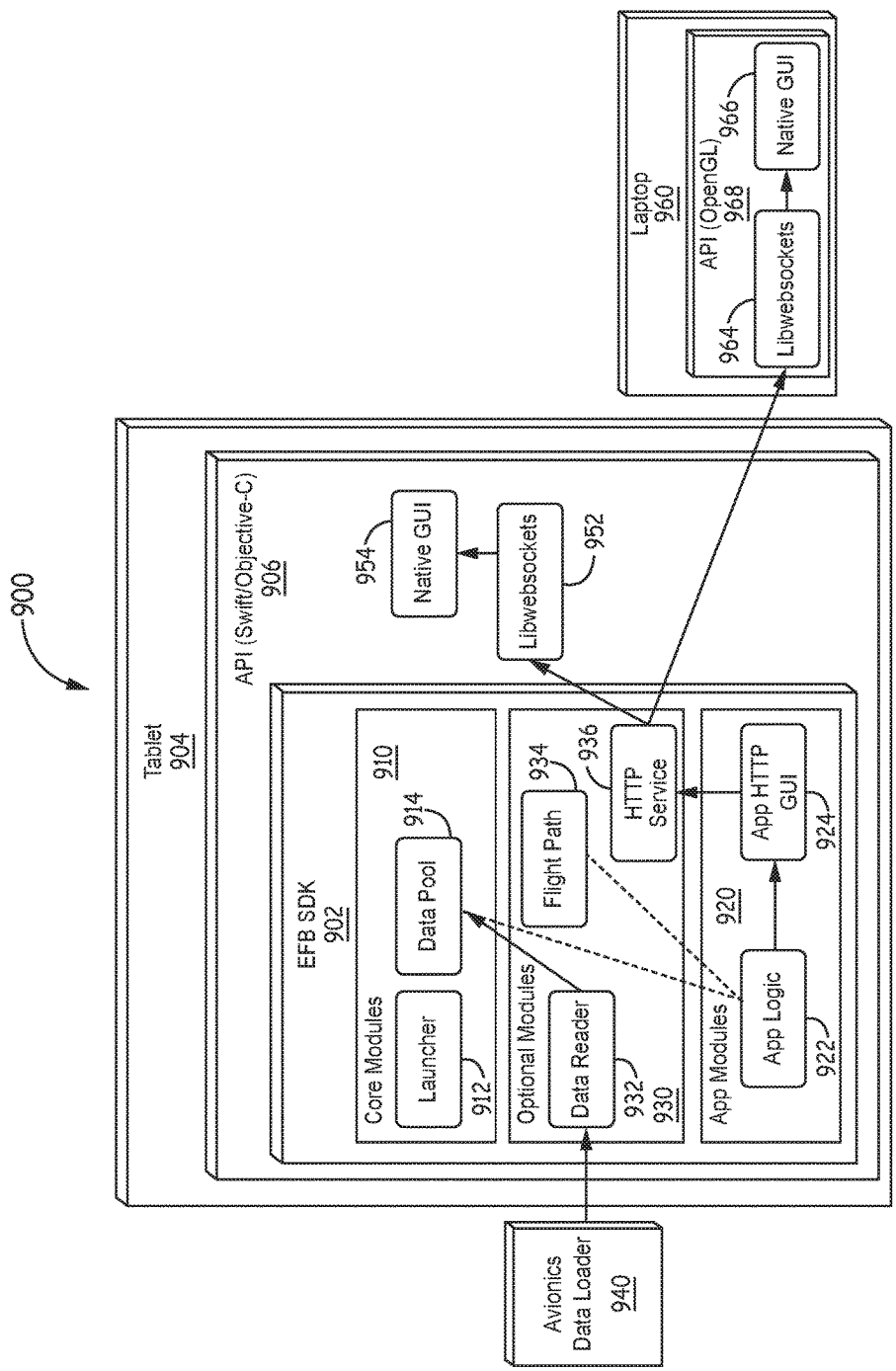

FIGS. 9A and 9B illustrate exemplary implementations of a portable server system 900 for an aircraft, in which the SDK application server is implemented as an EFB SDK 902 that resides on a portable computing device such as a tablet 904 (e.g., iPad). The EFB SDK 902 can operate within an API 906 (e.g., Swift, Objective-C) that resides on tablet 904. The EFB SDK 902 includes one or more processing core modules 910, one or more app modules 920, and one or more optional modules 930.

The core modules 910 can include a launcher module 912, and a data pool module 914. The app modules 920 can include an app logic module 922, and an app HTTP GUI module 924 (e.g., HTML5 GUI), which is in operative communication with app logic module 922. The optional modules 930 can include a data reader module 932, a flight path module 934, and an HTTP service module 936, which is in operative communication with app HTTP GUI module 924.

An avionics data loader 940 is in operative communication with EFB SDK 902. The avionics data loader 940 is configured to send avionics data to EFB SDK 902 through data reader module 932, which in turn sends the avionics data to data pool module 914. The app logic module 922 can access requested data from data pool module 914 and flight path module 934 to instruct HTTP GUI module 924 to create a GUI, which is sent to HTTP service module 936.

In the implementation shown in FIG. 9A, EFB SDK 902 communicates with an internal web browser 950 running on tablet 904 through HTTP service module 936. The web browser 950 displays requested data or other information on a screen of tablet 904. In addition, EFB SDK 902 is connectable to any other external device with a browser. For example, HTTP service module 936 can wirelessly communicate with a laptop 960 through a web browser 962 running on laptop 960, such as by using websockets. The web browser 962 displays requested data or other information on a screen of laptop 960.

In the implementation shown in FIG. 9B, EFB SDK 902 communicates with a native GUI running on tablet 904. For example, HTTP service module 936 can communicate with a libwebsockets module 952 running on API 906. The libwebsockets module 952 in turn communicates with a native GUI 954 (e.g., iOS GUI), which displays requested data or other information on the screen of tablet 904. In addition, EFB SDK 902 is connectable to one or more portable devices using a native GUI on the portable devices. For example, HTTP service module 936 can wirelessly communicate with laptop 960 through a libwebsockets module 964 running on laptop 960, such as by using websockets. The libwebsockets module 964 communicates with a native GUI 966 (e.g., Windows GUI), which both operate within an API 968 (e.g., OpenGL) on laptop 960. The native GUI 966 displays requested data or other information on the screen of laptop 960.

Figure 10:
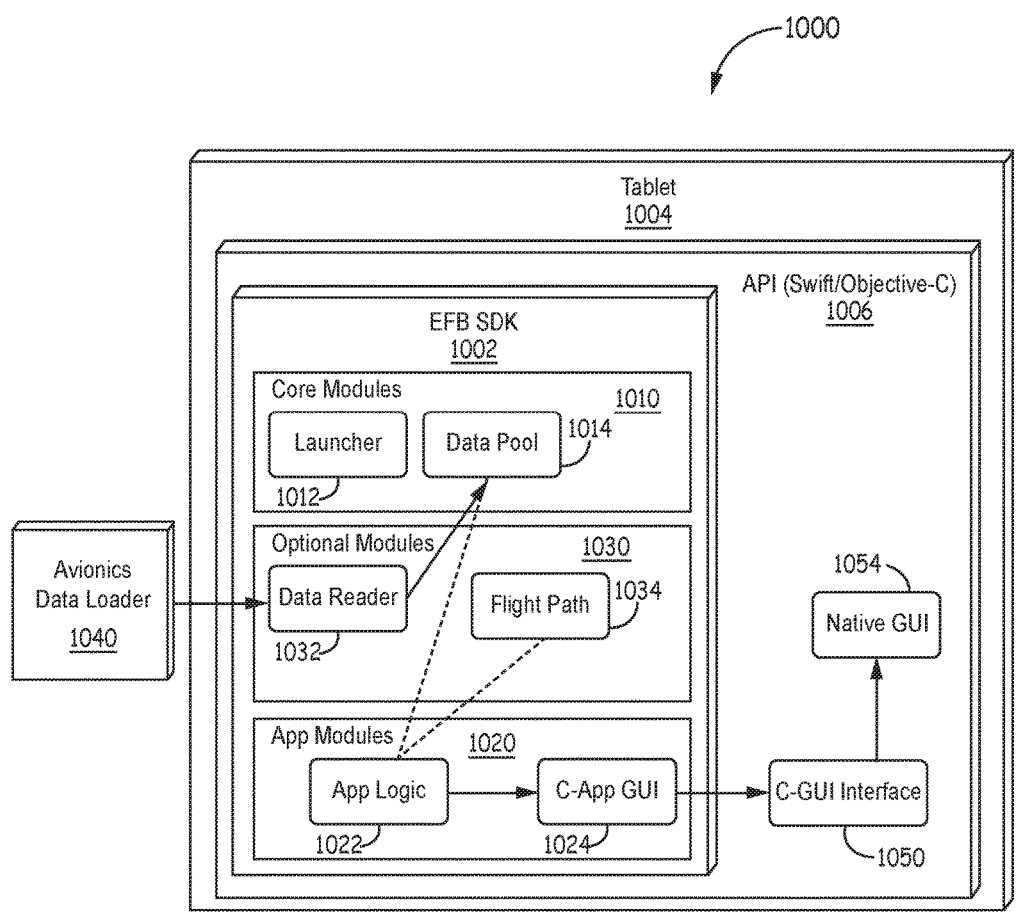
FIG. 10 is a block diagram of an exemplary implementation of a portable server system for an aircraft, according to one embodiment.

FIG. 10 depicts a portable server system 1000 for an aircraft, in which the SDK application server is implemented as an EFB SDK 1002 that resides on a tablet 1004 (e.g., iPad). The EFB SDK 1002 can operate within an API 1006 (e.g., Swift, Objective-C) that resides on tablet 1004. The EFB SDK 1002 includes one or more processing core modules 1010, one or more app modules 1020, and one or more optional modules 1030.

The core modules 1010 can include a launcher module 1012, and a data pool module 1014. The app modules 1020 can include an app logic module 1022, and a C-app GUI module 1024, which is in operative communication with app logic module 1022. The optional modules 1030 can include a data reader module 1032, and a flight path module 1034.

An avionics data loader 1040 is in operative communication with EFB SDK 1002. The avionics data loader 1040 is configured to send avionics data to EFB SDK 1002 through data reader module 1032, which in turn sends the avionics data to data pool module 1014. The app logic module 1022 can access requested data from data pool module 1014 and flight path module 1034 to instruct C-app GUI module 1024 to create a GUI.

The EFB SDK 1002 communicates with a native GUI running on tablet 1004 with a C-like interface. For example, C-app GUI module 1024 can communicate with a C-GUI interface 1050 running on API 1006. The C-GUI interface 1050 in turn communicates with a native GUI 1054 (e.g., iOS GUI), which displays requested data or other information on a screen of tablet 1004.

Figure 11:
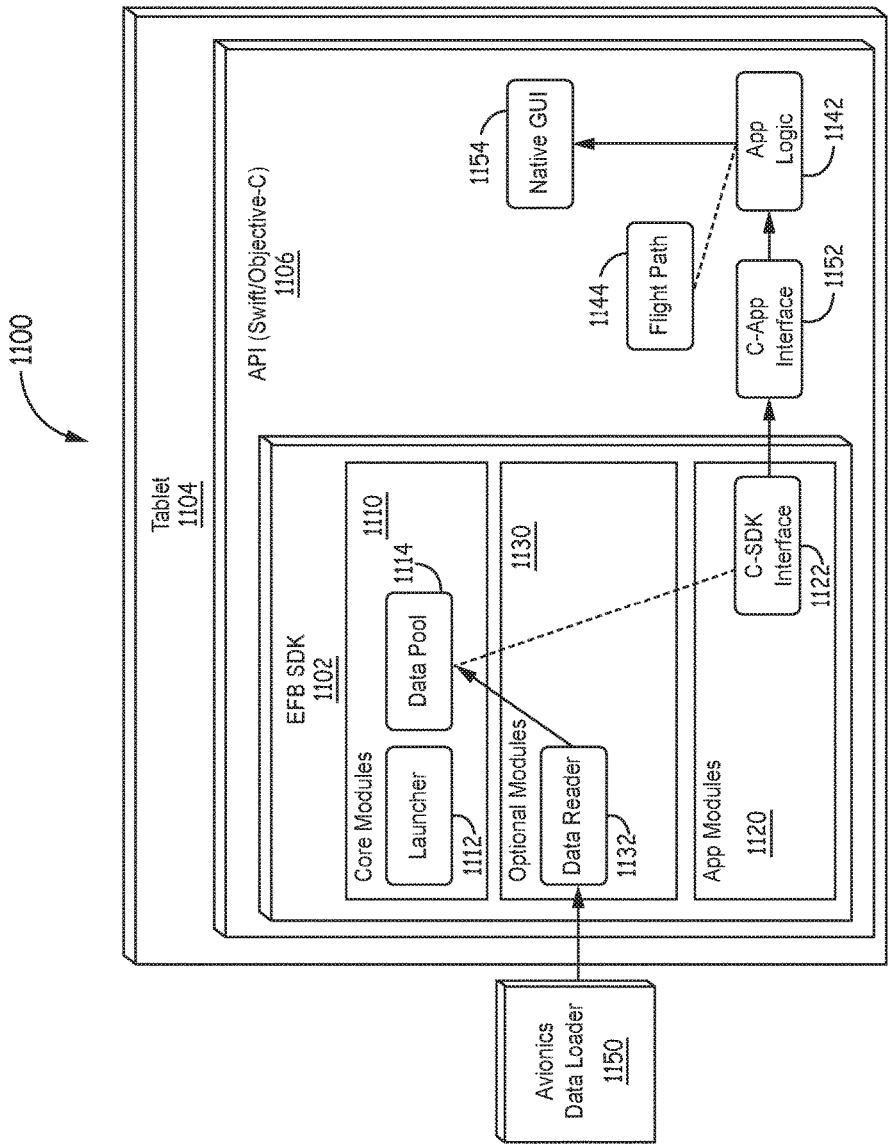
FIG. 11 is a block diagram of an exemplary implementation of a portable server system for an aircraft, according to another embodiment.

FIG. 11 depicts a portable system 1100, in which the SDK application server is implemented as an EFB SDK 1102 that is embedded in a native application that resides on a tablet 1104 (e.g., iPad). The EFB SDK 1102 can operate within an API 1106 (e.g., Swift, Objective-C) that resides on tablet 1104. This implementation provides a limited set of SDK required functions wrapped in a C-like interface, with all other functions implemented by the native application itself.

The EFB SDK 1102 includes one or more processing core modules 1110, one or more app modules 1120, and one or more optional modules 1130. The core modules 1110 can include a launcher module 1112, and a data pool module 1114. The app modules 1120 can include a C-SDK interface module 1122. The optional modules 1130 can include a data reader module 1132. An app logic module 1142 and a flight path module 1144 reside outside of EFB SDK 1102 on API 1106.

An avionics data loader 1150 is in operative communication with EFB SDK 1102. The avionics data loader 1150 is configured to send avionics data to EFB SDK 1102 through data reader module 1132, which in turn sends the avionics data to data pool module 1114. The C-SDK interface module 1122 can access requested data from data pool module 1114, which is sent to a C-app interface 1152 that resides on API 1106. The app logic module 1142 receives requested data from C-app interface 1152 and flight path module 1144, and sends instructions to a native GUI 1154 (e.g., iOS GUI), which displays the requested data or other information on a screen of tablet 1104.

Figure 12:
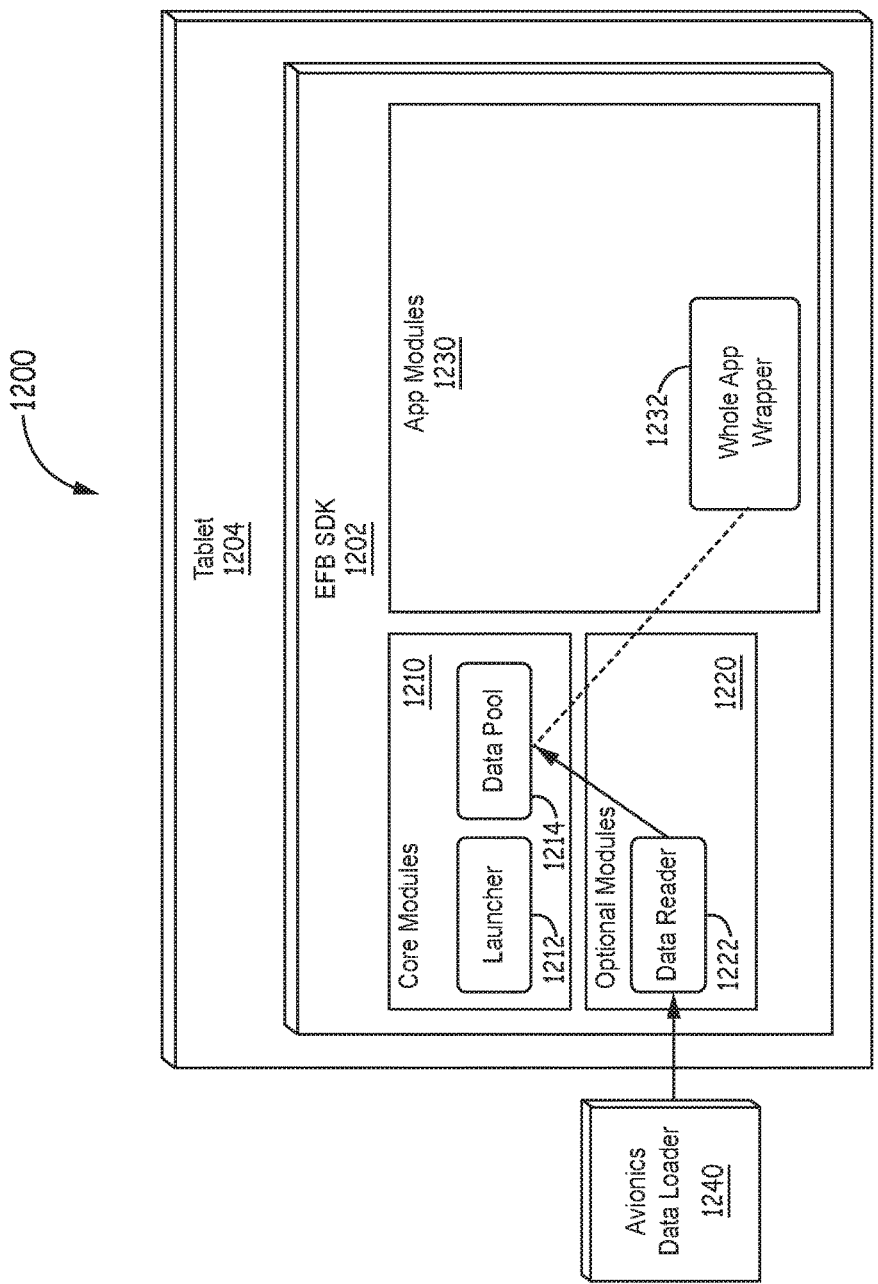
FIG. 12 is a block diagram of an exemplary implementation of a portable server system for an aircraft, according to a further embodiment.

FIG. 12 depicts a portable system 1200, in which the SDK application server is implemented as an EFB SDK 1202 that resides on a tablet 1204. In this implementation, a whole EFB application is embedded in EFB SDK 1202 and provides an SDK C++ interface.

The EFB SDK 1202 includes one or more processing core modules 1210, such as a launcher module 1212 and a data pool module 1214, as well as one or more optional modules 1220, such as a data reader module 1222. In addition, EFB SDK 1202 includes one or more app modules 1230, including a whole app wrapper module 1232 for implementing the EFB application.

An avionics data loader 1240 is in operative communication with EFB SDK 1202. The avionics data loader 1240 is configured to send avionics data to EFB SDK 1202 through data reader module 1222, which in turn sends the avionics data to data pool module 1214. The whole app wrapper module 1232 can access requested data from data pool module 1214, and provides instructions for displaying the requested data or other information on a screen of tablet 1204.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

A server system for an aircraft, comprising: an aircraft server unit that is operative to receive data from one or more data sources; and a software development kit (SDK) application server in operative communication with the aircraft server unit, the SDK application server comprising: one or more processing core modules configured to process the data from the one or more data sources; and one or more application modules including one or more aircraft tablet device logic modules that are configured to respectively execute one or more aircraft tablet device applications; wherein the data processed by the one or more processing core modules is separated from the one or more aircraft tablet device logic modules; wherein the SDK application server is configured to communicate with one or more external portable computing devices.

Example 2 includes the server system of Example 1, wherein the SDK application server is hosted on the aircraft server unit.

Example 3 includes the server system of Example 2, further comprising another SDK application server hosted on a dedicated ground server.

Example 4 includes the server system of Example 1, wherein the SDK application server is hosted on a separate device from the aircraft server unit.

Example 5 includes the server system of Example 1, wherein the SDK application server is hosted on a portable computing device separate from the aircraft server unit.

Example 6 includes the server system of any of Examples 1-5, wherein the aircraft server unit comprises an aircraft interface device, or a communications server unit.

Example 7 includes the server system of any of Examples 1-6, wherein interoperability between multiple aircraft tablet device applications is enabled by the SDK application server.

Example 8 includes the server system of any of Examples 1-7, wherein the one or more data sources comprise one or more avionics data sources, or an air-ground network.

Example 9 includes the server system of any of Examples 1-8, wherein the SDK application server further comprises one or more cabin entertainment applications accessible by one or more passenger devices.

Example 10 includes the server system of any of Examples 1-9, wherein the SDK application server is configured to wirelessly communicate with the one or more portable computing devices through a web browser on each of the one or more portable computing devices.

Example 11 includes the server system of any of Examples 1-9, wherein the SDK application server is configured to wirelessly communicate with the one or more portable computing devices through a native graphical user interface (GUI) on each of the one or more portable computing devices.

Example 12 includes the system of any of Examples 1-11, wherein the SDK application server is implemented with a server-client architecture that utilizes a hypertext transfer protocol (HTTP) and a websocket protocol.

Example 13 includes the system of any of Examples 1-12, wherein the SDK application server is operative to provide a protocol-agnostic user interface.

Example 14 includes a portable server system for an aircraft, comprising: a portable computing device; and a software development kit (SDK) application server hosted on the portable computing device, the SDK application server comprising: one or more processing core modules configured to process data from one or more avionics data sources; and one or more application modules including one or more aircraft tablet device logic modules that are configured to respectively execute one or more aircraft tablet device applications; wherein the data processed by the one or more processing core modules is separated from the one or more aircraft tablet device logic modules.

Example 15 includes the portable server system of Example 14, wherein the portable computing device comprises a tablet.

Example 16 includes the portable server system of any of Examples 14-15, further comprising an application programming interface (API) that resides on the portable computing device, wherein the SDK application server is embedded in the API.

Example 17 includes the portable server system of any of Examples 14-16, wherein the SDK application server is operative to communicate with an internal web browser running on the portable computing device, the web browser operative to display the processed data or other information on a screen of the portable computing device.

Example 18 includes the portable server system of Example 17, wherein the SDK application server is operative to wirelessly communicate with an external web browser running on at least one other portable computing device, the external web browser operative to display the processed data or other information on a screen of the at least one other portable computing device.

Example 19 includes the portable server system of any of Examples 14-16, wherein the SDK application server is operative to communicate with a native graphical user interface (GUI) running on the portable computing device, the native GUI operative to display the processed data or other information on a screen of the portable computing device.

Example 20 includes the portable server system of Example 19, wherein the SDK application server is operative to wirelessly communicate with an external native GUI running on at least one other portable computing device, the external native GUI operative to display the processed data or other information on a screen of the at least one other portable computing device.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A server system for an aircraft, comprising:
   an aircraft server unit that is operative to receive data from one or more data sources; and
   a software development kit (SDK) application server in operative communication with the aircraft server unit, the SDK application server comprising:
     one or more processing core modules configured to process the data from the one or more data sources, the one or more processing core modules including a data pool module;
     a data reader module configured to receive avionics data and send the avionics data to the data pool module; and
     one or more application modules including one or more aircraft tablet device logic modules that are configured to respectively execute one or more aircraft tablet device applications, the one or more aircraft tablet device logic modules further configured to access requested data from the data pool module and instruct a GUI module to create a graphical user interface (GUI) configured to display the requested data;
   wherein the data processed by the one or more processing core modules is separated from the one or more aircraft tablet device logic modules;
   wherein the SDK application server is configured to communicate with one or more external portable computing devices.

2. The server system of claim 1, wherein the SDK application server is hosted on the aircraft server unit.

3. The server system of claim 2, further comprising another SDK application server hosted on a dedicated ground server.

4. The server system of claim 1, wherein the SDK application server is hosted on a separate device from the aircraft server unit.

5. The server system of claim 1, wherein the aircraft server unit comprises an aircraft interface device, or a communications server unit.

6. The server system of claim 1, wherein interoperability between multiple aircraft tablet device applications is enabled by the SDK application server.

7. The server system of claim 1, wherein the one or more data sources comprise one or more avionics data sources, or an air-ground network.

8. The server system of claim 1, wherein the SDK application server further comprises one or more cabin entertainment applications accessible by one or more passenger devices.

9. The server system of claim 1, wherein the SDK application server is configured to wirelessly communicate with the one or more portable computing devices through a web browser on each of the one or more portable computing devices.

10. The server system of claim 1, wherein the SDK application server is configured to wirelessly communicate with the one or more portable computing devices through a native graphical user interface (GUI) on each of the one or more portable computing devices.

11. The server system of claim 1, wherein the SDK application server is implemented with a server-client architecture that utilizes a hypertext transfer protocol (HTTP) and a websocket protocol.

12. The server system of claim 1, wherein the SKD application is operative to provide a protocol-agnostic user interface.

13. A portable server system for an aircraft, comprising:
    a portable computing device; and
    a software development kit (SDK) application server hosted on the portable computing device, the SDK application server comprising:
      one or more processing core modules configured to process data from one or more avionics data sources, the one or more processing core modules including a data pool module;
      a data reader module configured to receive avionics data and send the avionics data to the data pool module; and
      one or more application modules including one or more aircraft tablet device logic modules that are configured to respectively execute one or more aircraft tablet device applications, the one or more aircraft tablet device logic modules further configured to access requested data from the data pool module and instruct a GUI module to create a graphical user interface (GUI) configured to display the requested data;
    wherein the data processed by the one or more processing core modules is separated from the one or more aircraft tablet device logic modules.

14. The portable server system of claim 13, wherein the portable computing device comprises a tablet.

15. The portable server system of claim 13, further comprising an application programming interface (API) that resides on the portable computing device, wherein the SDK application server is embedded in the API.

16. The portable server system of claim 13, wherein the SDK application server is operative to communicate with an internal web browser running on the portable computing device, the web browser operative to display the processed data or other information on a screen of the portable computing device.

17. The portable server system of claim 16, wherein the SDK application server is operative to wirelessly communicate with an external web browser running on at least one other portable computing device, the external web browser operative to display the processed data or other information on a screen of the at least one other portable computing device.

18. The portable server system of claim 13, wherein the SDK application server is operative to communicate with a native graphical user interface (GUI) running on the portable computing device, the native GUI operative to display the processed data or other information on a screen of the portable computing device.

19. The portable server system of claim 18, wherein the SDK application server is operative to wirelessly communicate with an external native GUI running on at least one other portable computing device, the external native GUI operative to display the processed data or other information on a screen of the at least one other portable computing device.

20. The server system of claim 1, wherein SDK application server further includes a flight path module, and
    wherein the aircraft tablet device logic module is further configured to access requested data from the flight path module.

* * * * *